(12) United States Patent
Wang et al.

(10) Patent No.: US 11,880,189 B2
(45) Date of Patent: Jan. 23, 2024

(54) METHOD AND APPARATUS FOR OPTIMIZING GASIFIER MODEL

(71) Applicant: Siemens Aktiengesellschaft, Munich (DE)

(72) Inventors: De Hui Wang, Beijing (CN); Shuang Zhao, Beijing (CN); Zhong Wei Tian, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 18/246,718

(22) PCT Filed: Sep. 29, 2020

(86) PCT No.: PCT/CN2020/118997
§ 371 (c)(1),
(2) Date: Mar. 27, 2023

(87) PCT Pub. No.: WO2022/067552
PCT Pub. Date: Apr. 7, 2022

(65) Prior Publication Data
US 2023/0367294 A1 Nov. 16, 2023

(51) Int. Cl.
*G05B 19/4155* (2006.01)
(52) U.S. Cl.
CPC .......... *G05B 19/4155* (2013.01); *G05B 2219/41108* (2013.01)
(58) Field of Classification Search
None
See application file for complete search history.

(56) References Cited

U.S. PATENT DOCUMENTS

| 10,677,037 | B1 | 6/2020 | Basu | E21B 44/00 |
| 2014/0298724 | A1* | 10/2014 | Rozelle | C10J 3/50 |
| | | | | 48/197 R |
| 2022/0340827 | A1* | 10/2022 | Wang | C10J 3/723 |

FOREIGN PATENT DOCUMENTS

| CN | 105 930 585 | 9/2016 | G06F 17/50 |
| CN | 105 955 020 | 9/2016 | G05B 13/04 |
| CN | 107 641 675 | 1/2018 | C21B 13/00 |

OTHER PUBLICATIONS

Search Report for International Application No. PCT/CN2020/118997, 4 pages, dated Jun. 29, 2021.

* cited by examiner

*Primary Examiner* — Ryan A Jarrett
(74) *Attorney, Agent, or Firm* — Slayden Grubert Beard PLLC

(57) ABSTRACT

Various embodiments of the teachings herein include a method for optimizing a gasifier model. Some examples include: virtually partitioning the gasifier by temperature; enabling the gasifier model to input feed split from total feed based on a respective proportion coefficient in each virtual partition to perform gasification reactions independently by each virtual partition; enabling the gasifier model to determine a virtual value of a gasifier parameter after mixing the virtual partitions, quenching and shifting when gasification reactions reach an equilibrium in each virtual partition; determining a measured value of the gasifier parameter when the total feed is input; and adjusting the proportion coefficients based on a comparison result between the measured value and the virtual value of the gasifier parameter.

13 Claims, 5 Drawing Sheets

METHOD AND APPARATUS FOR OPTIMIZING GASIFIER MODEL

CROSS-REFERENCE TO RELATED APPLICATIONS

This application is a U.S. National Stage Application of International Application No. PCT/CN2020/118997 filed Sep. 20, 2020, which designates the United States of America, the contents of which are hereby incorporated by reference in their entirety.

TECHNICAL FIELD

The present disclosure relates to the technical field of industrial control. Various embodiment of the teachings herein include methods and/or apparatus for optimizing a gasifier model.

BACKGROUND

In the process of coal gasification, the material to be gasified and auxiliary materials undergo violent gasification reactions in a gasifier. The main characteristics of an entrained-flow gasifier may be summarized to be: 1) strong coupling among the flow field, temperature field and reaction field; 2) an intensified transient process caused by pure oxygen, with observable flame flickers; and 3) intense turbulence caused by instable pulverized coal fed into the high-pressure reactor. In addition, it is also characterized by a high speed, a high temperature, and a reaction equilibrium reached in seconds or milliseconds. After the gasification process, the scrubbed gas will flow out of the boundary area, and the slag will be discharged from the reaction chamber. The temperature inside a gasifier is very high, the temperature at the flame center may be as high as 2,000° C., and even the average temperature can be higher than 1,300° C. There is no measurement method for high temperatures in today's industrial applications. Additionally, the measurement accuracy of coal feeding and syngas is very challenging.

At present, lumped parameter models or computational fluid dynamics (CFD) models are generally used for modeling gasifiers. For the lumped parameter model, due to the inhomogeneous flow field, temperature field and reaction field in the reaction chamber, there is a considerable discrepancy between the model calculation results and the actual measurement results. The CFD model requires a long computation time, and the measurement points used in an actual system are not sufficient to support the verification of various assumptions in the CFD model.

SUMMARY

Some embodiments of the teachings of the present disclosure include methods and/or apparatus for optimizing a gasifier model and a computer-readable storage medium. For example, some embodiments include a method for optimizing a gasifier model, comprising: virtually partitioning the gasifier by temperature; enabling the gasifier model to input feed split from total feed based on a respective proportion coefficient in each virtual partition, to perform gasification reactions independently by each virtual partition; enabling the gasifier model to determine a virtual value of a gasifier parameter after mixing the virtual partitions, quenching and shifting when gasification reactions reach equilibrium in each virtual partition; determining a measured value of the gasifier parameter when the total feed is input; and adjusting the proportion coefficients based on a comparison result between the measured value and the virtual value of the gasifier parameter.

As another example, some embodiments include a method (100) for optimizing a gasifier model, including: virtually partitioning the gasifier by temperature (101); enabling the gasifier model to input feed split from total feed based on a respective proportion coefficient in each virtual partition, to perform gasification reactions independently by each virtual partition (102); enabling the gasifier model to determine a virtual value of a gasifier parameter after mixing the virtual partitions, quenching and shifting when gasification reactions reach an equilibrium in each virtual partition (103); determining a measured value of the gasifier parameter when the total feed is input (104); and adjusting the proportion coefficients based on a comparison result between the measured value and the virtual value of the gasifier parameter (105).

In some embodiments, virtually partitioning the gasifier by temperature (101) includes: dividing the gasifier into a first virtual partition and a second virtual partition by temperature; inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of (100-a) %; and adjusting the proportion coefficients based on a comparison result between the measured value and the virtual value of the gasifier parameter (105) comprises: adjusting the value of said a based on a comparison result between the measured value and the virtual value of the gasifier parameter.

In some embodiments, virtually partitioning the gasifier by temperature (101) is: dividing the gasifier into a first virtual partition, a second virtual partition and a third virtual partition by temperature; inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of b %; in the second virtual partition, inputting feed split from the total feed at a proportion coefficient of (100-a-b) %; and adjusting the proportion coefficients based on a comparison result between the measured value and the virtual value of the gasifier parameter (105) comprises: adjusting the values of said a and said b based on a comparison result between the measured value and the virtual value of the gasifier parameter.

In some embodiments, adjusting the proportion coefficients based on a comparison result between the measured value and the virtual value of the gasifier parameter (105) comprises at least one of the following: when the measured value of the syngas temperature at the outlet is greater than the virtual value of the syngas temperature at the outlet, increasing the proportion coefficient of the virtual partition corresponding to a high temperature or decreasing the proportion coefficient of the virtual partition corresponding to a low temperature; when the measured value of the syngas temperature at the outlet is smaller than the virtual value of the syngas temperature at the outlet, decreasing the proportion coefficient of the virtual partition corresponding to a high temperature or increasing the proportion coefficient of the virtual partition corresponding to a low temperature; when the measured value of the syngas composition at the outlet tends to be in a high temperature condition more than the virtual value of the syngas composition at the outlet, increasing the proportion coefficient of the virtual partition corresponding to a high temperature or decreasing the proportion coefficient of the virtual partition corresponding to a low temperature; or when the measured value of the syngas composition at the outlet tends to be in a low temperature condition more than the virtual value of the syngas composition at the outlet, decreasing the proportion coefficient of the virtual partition corresponding to high temperature or increasing the proportion coefficient of the virtual partition corresponding to low temperature.

In some embodiments, the method (100) further comprises: enabling the gasifier model to determine a first time between the time of total feed input and the time of outlet stabilization; measuring a first time between the time of total feed input and the time of outlet stabilization; and adjusting an inertia time constant of the gasifier model based on the difference between the first time and the second time.

In some embodiments, determining a measured value of the gasifier parameter when the total feed is input (104) comprises: obtaining a current measured value of the gasifier parameter when the total feed is input, or querying a historical database to obtain a historical measured value of the gasifier parameter when the total feed is input.

In some embodiments, the gasifier parameters comprise: parameters at the outlet of the gasifier or at the periphery of the outlet; wherein the gasifier parameters include at least one of the following: a syngas temperature; a syngas composition; a temperature difference in burner cooling water; heat absorbed by burner support; heat absorbed by water wall; an oxygen/coal/steam ratio; heat absorbed by slag notch; particle size distribution of slag; a slag/filter cake ratio; thermocouple temperature distribution.

As another example, some embodiments include an apparatus (400) for optimizing a gasifier model, including: a partitioning module (401), used to virtually partition the gasifier by temperature; an input module (402), used to enable the gasifier model to input feed split from total feed based on a respective proportion coefficient in each virtual partition, to perform gasification reactions independently by each virtual partition; a virtual value determining module (403), used to enable the gasifier model to determine a virtual value of a gasifier parameter after mixing the virtual partitions, quenching and shifting when gasification reactions reach equilibrium in each virtual partition; a measured value determining module (404), used to determine a measured value of the gasifier parameter when the total feed is input; and an adjusting module (405), used to adjust the proportion coefficients based on a comparison result between the measured value and the virtual value of the gasifier parameter.

In some embodiments, the partitioning module (401) is used to divide the gasifier into a first virtual partition and a second virtual partition by temperature; inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of (100-a) %; and the adjusting module (405) is used to adjust the value of said a based on a comparison result between the measured value and the virtual value of the gasifier parameter.

In some embodiments, the partitioning module (401) is used to divide the gasifier into a first virtual partition, a second virtual partition and a third virtual partition by temperature; inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of b %; in the second virtual partition, inputting feed split from the total feed at a proportion coefficient of (100-a-b) %; and the adjusting module (405) is used to adjust the values of said a and said b based on a comparison result between the measured value and the virtual value of the gasifier parameter.

In some embodiments, the adjusting module (405) is used to perform at least one of the following: when the measured value of the syngas temperature at the outlet is greater than the virtual value of the syngas temperature at the outlet, increasing the proportion coefficient of the virtual partition corresponding to a high temperature or decreasing the proportion coefficient of the virtual partition corresponding to a low temperature; when the measured value of the syngas temperature at the outlet is smaller than the virtual value of the syngas temperature at the outlet, decreasing the proportion coefficient of the virtual partition corresponding to a high temperature or increasing the proportion coefficient of the virtual partition corresponding to a low temperature; when the measured value of the syngas composition at the outlet tends to be in a high temperature condition more than the virtual value of the syngas composition at the outlet, increasing the proportion coefficient of the virtual partition corresponding to a high temperature or decreasing the proportion coefficient of the virtual partition corresponding to a low temperature; and when the measured value of the syngas composition at the outlet tends to be in a low temperature condition more than the virtual value of the syngas composition at the outlet, decreasing the proportion coefficient of the virtual partition corresponding to a high temperature or increasing the proportion coefficient of the virtual partition corresponding to a low temperature.

In some embodiments, the adjusting module (405) is also used to enable the gasifier model to determine a first time between the time of total feed input to the time of outlet stabilization; to measure a second time between the time of total feed input to the time of outlet stabilization; to adjust an inertia time constant of the gasifier model based on the difference between the first time and the second time.

As another example, some embodiments include an apparatus (500) for optimizing a gasifier model, including a processor (501), a memory (502) and a computer program that is stored in the memory (502) and can be run on the processor (501), and the computer program, when executed by the processor (501), implements one or more of the methods (100) for optimizing a gasifier model as described herein.

As another example, some embodiments include a computer-readable storage medium, characterized in that a computer program is stored on the computer-readable storage medium, and the computer program, when executed by a processor, implements one or more of the methods (100) for optimizing a gasifier model as described herein.

Figure 1:
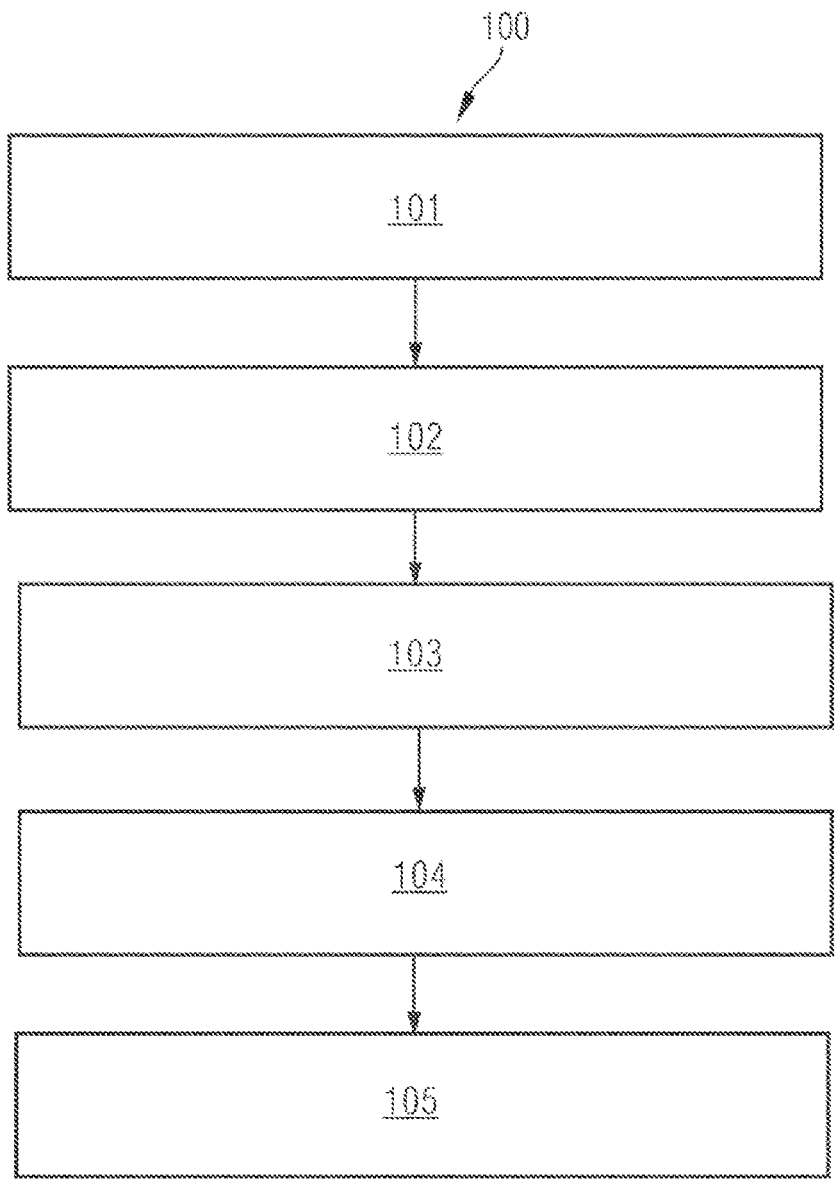
FIG. 1 is a flowchart showing an example method for optimizing a gasifier model incorporating teachings of the present disclosure.

In the drawings, the following reference numerals are used:

| 100 | Method for optimizing a gasifier model |
| 101-105 | Steps |
| 20 | Gasifier |
| 21 | Total feed |
| 22 | First virtual partition |
| 23 | Second virtual partition |
| 24 | Quenching and shifting |
| 25 | Parameter value at the outlet |
| 26 | First-order inertia time constant of the syngas scrubbing and saturation process |
| 27 | Temperature difference in burner cooling water |
| 28 | Heat absorbed by burner support |
| 29 | Heat absorbed by water wall |
| 30 | Oxygen/coal/steam ratio |
| 31 | Heat absorbed by slag notch |
| 32 | Particle size distribution of slag and slag/filter cake ratio |
| 33 | Thermocouple temperature distribution |
| 42 | First virtual partition |
| 43 | Second virtual partition |
| 44 | Third virtual partition |
| 400 | Apparatus for optimizing a gasifier model |
| 401 | Partitioning module |
| 402 | Input module |
| 403 | Virtual value determining module |
| 404 | Measured value determining module |
| 405 | Adjusting module |
| 500 | Apparatus for optimizing a gasifier model |
| 501 | Processor |
| 502 | Memory |

DETAILED DESCRIPTION

In methods incorporating teachings of the present disclosure, the virtual values after mixing are computed in a steady state by the partitioning mechanism, and are then corrected by use of measured values (for example, massive operating data), thereby converting the gasifier model as a mechanism model into a linearized discrete data model, thus quickly predicting the reaction components to meet the needs of APC/RTO and operational diagnosis in the order of milliseconds and seconds and also ensure the accuracy of model computation results.

In some embodiments, virtually partitioning the gasifier by temperature includes: dividing the gasifier into a first virtual partition and a second virtual partition by temperature; inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of (100-a) %; and adjusting the proportion coefficients based on a comparison result between the measured value and the virtual value of the gasifier parameter comprises: adjusting the value of a based on a comparison result between the measured value and the virtual value of the gasifier parameter. Thus, virtual partitioning is implemented based on two corresponding temperature values, making the implementation easy and convenient.

In some embodiments, virtually partitioning the gasifier by temperature includes: dividing the gasifier into a first virtual partition, a second virtual partition and a third virtual partition by temperature; inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of b %; in the second virtual partition, inputting feed split from the total feed at a proportion coefficient of (100-a-b) %; and adjusting the proportion coefficients based on a comparison result between the measured value and the virtual value of the gasifier parameter comprises: adjusting the values of a and b based on the comparison result between the measured value and the virtual value of the gasifier parameter. Thus, virtual partitioning is implemented based on three corresponding temperature values, improving the accuracy of model computation results.

In some embodiments, adjusting the proportion coefficients based on a comparison result between the measured value and the virtual value of the gasifier parameter comprises at least one of the following: when the measured value of the syngas temperature at the outlet is greater than the virtual value of the syngas temperature at the outlet, increasing the proportion coefficient of the virtual partition corresponding to a high temperature or decreasing the proportion coefficient of the virtual partition corresponding to a low temperature; when the measured value of the syngas temperature at the outlet is smaller than the virtual value of the syngas temperature at the outlet, decreasing the proportion coefficient of the virtual partition corresponding to a high temperature or increasing the proportion coefficient of the virtual partition corresponding to a low temperature; when the measured value of the syngas composition at the outlet tends to be in a high temperature condition more than the virtual value of the syngas composition at the outlet, increasing the proportion coefficient of the virtual partition corresponding to a high temperature or decreasing the proportion coefficient of the virtual partition corresponding to a low temperature; when the measured value of the syngas composition at the outlet tends to be in a low temperature condition more than the virtual value of the syngas composition at the outlet, decreasing the proportion coefficient of the virtual partition corresponding to a high temperature or increasing the proportion coefficient of the virtual partition corresponding to a low temperature. By adjusting the proportion coefficients through the comparison between the measured value and the virtual value, the difference between the measured value and the virtual value is minimized, and thus the gasifier model is more accurate.

In some embodiments, the method further comprises: enabling the gasifier model to determine a first time between the time of total feed input and the time of outlet stabilization; measuring a first time between the time of total feed input and the time of outlet stabilization; and adjusting an inertia time constant of the gasifier model based on the difference between the first time and the second time. Therefore, the inertia time constant of the gasifier model can be corrected by the time difference.

In some embodiments, determining a measured value of the gasifier parameter when the total feed is input comprises obtaining a current measured value of the gasifier parameter when the total feed is input, or querying a historical database to obtain a historical measured value of the gasifier parameter when the total feed is input. Therefore, the gasifier model can be corrected with massive historical data, and also with real-time data.

In some embodiments, the gasifier parameters are: parameters at the outlet of the gasifier or at the periphery of the outlet; wherein the gasifier parameters include at least one of the following: a syngas temperature; a syngas composition; a temperature difference in burner cooling water; heat absorbed by burner support; heat absorbed by water wall; an oxygen/coal/steam ratio; heat absorbed by slag notch; particle size distribution of slag; a slag/filter cake ratio; thermocouple temperature distribution. Therefore, the gasifier parameters can be implemented in a plurality of ways, and are widely applicable.

As another example, some embodiments include an apparatus for optimizing a gasifier model comprising: a partitioning module, used to virtually partition the gasifier by temperature; an input module, used to enable the gasifier model to input feed split from total feed based on a respective proportion coefficient in each virtual partition, to perform gasification reactions independently by each virtual partition; a virtual value determining module, used to enable the gasifier model to determine a virtual value of a gasifier parameter after mixing the virtual partitions, quenching and shifting when gasification reactions reach equilibrium in each virtual partition; a measured value determining module, used to determine a measured value of the gasifier parameter when the total feed is input; and an adjusting module, used to adjust the proportion coefficients based on a comparison result between the measured value and the virtual value of the gasifier parameter. In some embodiments, the virtual values after mixing are computed in a steady state by the partitioning mechanism, and are then corrected by use of measured values (for example, massive operating data), thereby converting the gasifier model as a mechanism model into a linearized discrete data model, thus quickly predicting the reaction components to meet the needs of APC/RTO and operational diagnosis in the order of milliseconds and seconds and also ensure the accuracy of model computation results.

In some embodiments, the partitioning module is used to divide the gasifier into a first virtual partition and a second virtual partition by temperature; and inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of (100-a) %; the adjusting module is used to adjust the value of a based on the comparison result between the measured value and the virtual value of the gasifier parameter. Thus, virtual partitioning is implemented based on two corresponding temperature values, making the implementation easy and convenient.

In some embodiments, the partitioning module is used to divide the gasifier into a first virtual partition, a second virtual partition and a third virtual partition; inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of b %; in the second virtual partition, inputting feed split from the total feed at a proportion coefficient of (100-a-b) %; the adjusting module is used to adjust the values of a and b based on a comparison result between the measured value and the virtual value of the gasifier parameter. Thus, virtual partitioning is implemented based on three corresponding temperature values, improving the accuracy of model computation results.

In one embodiment, the adjusting module is used to perform at least one of the following: when the measured value of the syngas temperature at the outlet is greater than the virtual value of the syngas temperature at the outlet, increasing the proportion coefficient of the virtual partition corresponding to a high temperature or decreasing the proportion coefficient of the virtual partition corresponding to a low temperature; when the measured value of the syngas temperature at the outlet is smaller than the virtual value of the syngas temperature at the outlet, decreasing the proportion coefficient of the virtual partition corresponding to a high temperature or increasing the proportion coefficient of the virtual partition corresponding to a low temperature; when the measured value of the syngas composition at the outlet tends to be in a high temperature condition more than the virtual value of the syngas composition at the outlet, increasing the proportion coefficient of the virtual partition corresponding to a high temperature or decreasing the proportion coefficient of the virtual partition corresponding to a low temperature; or when the measured value of the syngas composition at the outlet tends to be in a low temperature condition more than the virtual value of the syngas composition at the outlet, decreasing the proportion coefficient of the virtual partition corresponding to a high temperature or increasing the proportion coefficient of the virtual partition corresponding to a low temperature. By adjusting the proportion coefficients through the comparison between the measured value and the virtual value, the difference between the measured value and the virtual value is minimized, and thus the gasifier model is more accurate.

In some embodiments, the adjusting module is also used to enable the gasifier model to determine a first time between the time of total feed input to the time of outlet stabilization; measure a second time between the time of total feed input to the time of outlet stabilization; and adjust an inertia time constant of the gasifier model based on the difference between the first time and the second time. Therefore, the inertia time constant of the gasifier model can be corrected by the time difference.

As another example, some embodiments include an apparatus for optimizing a gasifier model, comprising a processor, a memory and a computer program that is stored in the memory and can be run on the processor, the computer program, when executed by the processor, implementing one or more of the methods for optimizing a gasifier model as described herein.

As another example, some embodiments include a computer-readable storage medium, which has a computer program stored thereon, the computer program, when executed by a processor, implementing one or more of the methods for optimizing a gasifier model as described herein.

The teachings of the present disclosure are further described in detail by referring to the drawings and the example embodiments, so that its technical solution and advantages become clearer. It should be understood that the specific embodiments described here are only used to illustratively explain, and are not used to limit the scope of the present disclosure. In order to be concise and intuitive in the description, the teachings of the present disclosure are described below by referring to several representative embodiments. The large amount of details in the embodiments are only used to help to understand. However, the technical solution of the present disclosure are limited to these details. In order to avoid unnecessarily obscuring the scope, some embodiments are not described in detail, but only a framework is given. Hereinafter, "including" means "including but not limited to", and "according to . . . " means "at least according to . . . , but not limited to . . . ". Due to Chinese language habits, when the quantity of an element is not specified hereinafter, it means that there may be one or several of the element, or it can be understood as there is at least one of it.

In the actual operation of a gasifier, the operator can only rely on the contents of methane and carbon dioxide at the outlet of the gasifier and the temperature difference in the burner cooling water to roughly determine the condition of the gasifier based on experience. However, these quantities have their corresponding hysteresis that is not negligible, they may be very conservative, and are greatly affected by human factors. The gasification condition may not be good (as it is not that a low gasification temperature can ensure protection of the burner, ramming mix layer, and water wall layer), or a component may have been burned. The lack or inaccuracy of the gasifier model leads to a deviation in the understanding of the reaction process, resulting in a large fluctuation range of the control process. For example, the fluctuation of the oxygen/coal ratio leads to a shorter life of the burner and the burner wall, and a poor gasification condition leads to an increase in the dust content, too fine ash residue, more fine ash, more filter cakes and a lower carbon conversion rate, and at the same time causes difficulties for downstream syngas washing and wastewater treatment, causing various problems such as abrasion, corrosion, scaling, etc.

The method for optimizing a gasifier model described herein are based on the integration of mechanism modeling and big data analysis, and the combination of transient and static modeling, and is closely related to the measurement data, to achieve accuracy, meet the needs and reach a high computation speed. In some embodiments, an existing gasifier model (i.e., a mechanism model) in the form of a lumped parameter model that is widely applied currently is corrected by use of measured values (for example, massive operating data), thereby converting the gasifier model as a mechanism model into a linearized discrete data model, to meet the needs of APC/RTO and operational diagnosis in the order of milliseconds and seconds and also ensure the accuracy of model computation results.

In some embodiments, the gasifier may be divided into at least two virtual regions working at different temperatures, the virtual regions are mixed after the reactions therein are assumed to have stabilized, and after an assumed shift reaction at a certain degree of quenching, the product is finally matched with the measured product composition and flow with the same feed. In the process, the input substances are assigned to a virtual region at a percentage, which is variable. The gasifier model performs computation for energy and mass reaction equilibrium in each virtual region, and then performs computation for the mixing process to obtain the outlet temperature, composition, flow, etc., (i.e., a virtual value as one of the comparison objects). The compared objects are the corresponding actual measured parameters with same feed.

FIG. 1 is a flowchart of an example method for optimizing a gasifier model incorporating teachings of the present disclosure. The elements shown in FIG. 1 are representative and may be performed in a different order and/or simultaneously in some embodiments. As shown in FIG. 1, the method comprises:

Step 101: virtually partitioning the gasifier by temperature.

Step 102: enabling the gasifier model to input feed split from total feed based on a respective proportion coefficient in each virtual partition, to perform gasification reactions independently by each virtual partition. Here, the gasifier model is enabled to input feed split from total feed based on a respective proportion coefficient in each virtual partition, to perform gasification reactions independently by each virtual partition. In the process, the gasifier model is a mechanism model of the gasifier. The mechanism model can be generated in advance based on various modeling methods. A mechanism model, also known as a white-box model, is an accurate mathematical model established based on the internal mechanism of the object, the production process, or the transfer mechanism of the material flow. It is a mathematical model of an object or process based on the mass balance equation, energy balance equation, momentum balance equation, phase balance equation, certain physical property equations, chemical reaction laws, etc. The parameters of a mechanism model are easy to adjust, and the resulting model has strong adaptability. Its disadvantage is that, for some objects, it is difficult to write the mathematical expression, or it cannot be applied when some coefficients in the expression are still difficult to determine. Mechanism models often require a large number of parameters. If these parameters cannot be obtained well, it will also affect the simulation effect of a model.

Step 103: enabling the gasifier model to determine a virtual value of a gasifier parameter after mixing the virtual partitions, quenching and shifting when gasification reactions reach equilibrium in each virtual partition.

Step 104: determining a measured value of the gasifier parameter when the total feed is input. In some embodiments, determining a measured value of the gasifier parameter comprises: obtaining a current measured value of the gasifier parameter, or querying a historical database to obtain a historical measured value of the gasifier parameter. In some embodiments, the gasifier parameters are: parameters at the outlet of the gasifier or at the periphery of the outlet; wherein the gasifier parameters include at least one of the following: a syngas temperature; a syngas composition; a temperature difference in burner cooling water; heat absorbed by burner support; heat absorbed by water wall; an oxygen/coal/steam ratio; heat absorbed by slag notch; particle size distribution of slag; a slag/filter cake ratio; thermocouple temperature distribution, etc.

Step 105: adjusting the proportion coefficients based on a comparison result between the measured value and the virtual value of the gasifier. Here, the proportion coefficients are adjusted in the following principle: the virtual value of the gasifier parameter calculated based on the adjusted proportion coefficients is closer to the measured value of the gasifier parameter than the virtual value of the gasifier parameter calculated by the proportion coefficients before the adjustment.

In some embodiments, adjusting the proportion coefficients based on a comparison result between the measured value and the virtual value of the gasifier parameter in Step 105 comprises at least one of the following:

(1) when the measured value of the syngas temperature at the outlet is greater than the virtual value of the syngas temperature at the outlet, increasing the proportion coefficient of the virtual partition corresponding to a high temperature or decreasing the proportion coefficient of the virtual partition corresponding to a low temperature;

(2) when the measured value of the syngas temperature at the outlet is smaller than the virtual value of the syngas temperature at the outlet, decreasing the proportion coefficient of the virtual partition corresponding to a high temperature or increasing the proportion coefficient of the virtual partition corresponding to a low temperature;

(3) when the measured value of the syngas composition at the outlet tends to be in a high temperature condition more than the virtual value of the syngas composition at the outlet, increasing the proportion coefficient of the virtual partition corresponding to a high temperature or decreasing the proportion coefficient of the virtual partition corresponding to a low temperature; or (4) when the measured value of the syngas composition at the outlet tends to be in a low temperature condition more than the virtual value of the syngas composition at the outlet, decreasing the proportion coefficient of the virtual partition corresponding to a high temperature or increasing the proportion coefficient of the virtual partition corresponding to a low temperature.

In some embodiments, virtually partitioning the gasifier by temperature in Step 101 includes: dividing the gasifier into a first virtual partition and a second virtual partition by temperature; wherein, inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of (100-a) %; adjusting the proportional coefficients based on a comparison result between the measured value and the virtual value of the gasifier parameter in Step 105 comprises: modifying the value of a based on the comparison process between the measured value and the virtual value of the gasifier parameter.

Figure 2:
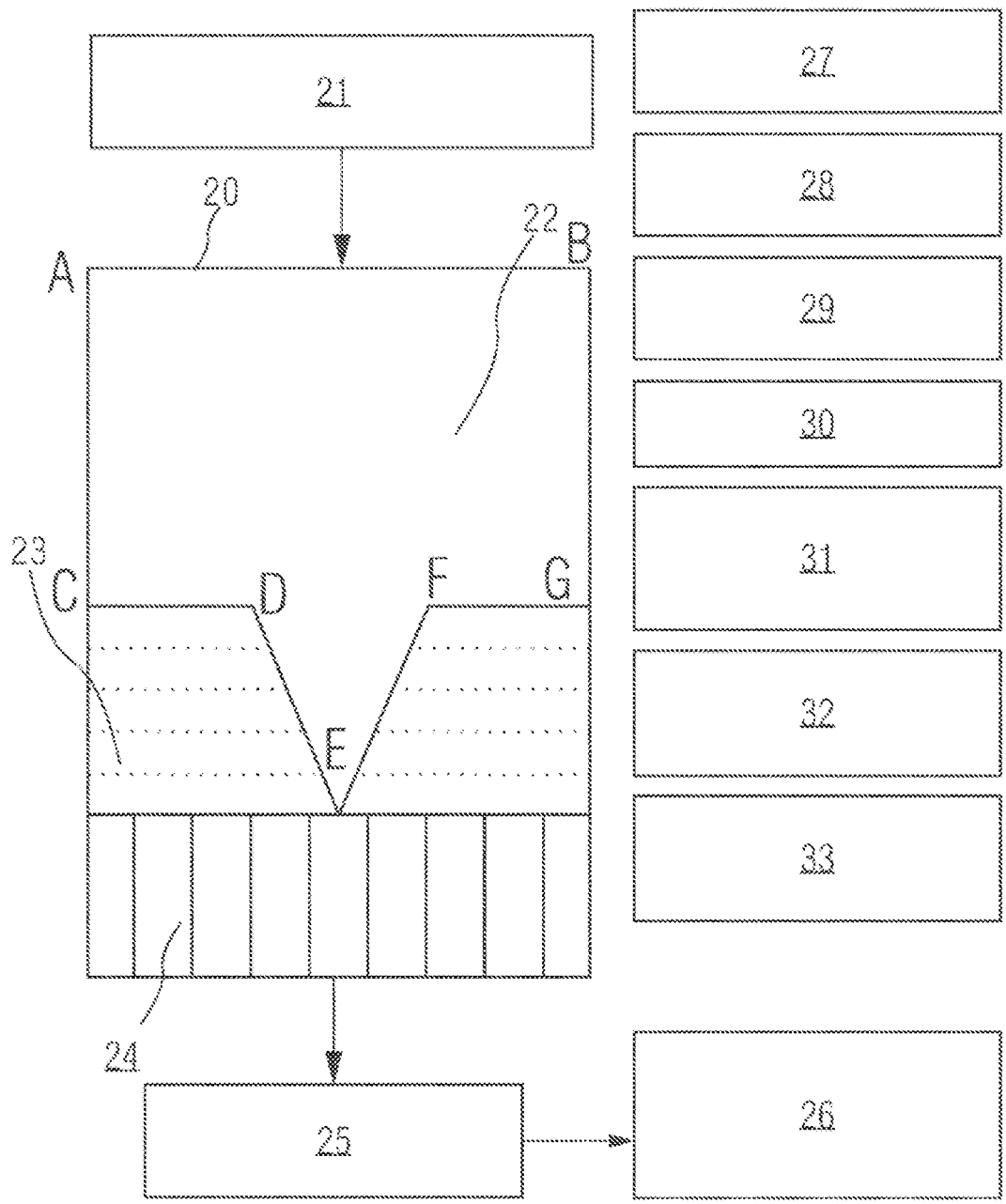
FIG. 2 is a flowchart of an example method for optimizing two virtual partitions incorporating teachings of the present disclosure.

FIG. 2 is a flowchart of an example method for optimizing two virtual partitions incorporating teachings of the present disclosure. A gasifier model in the form of a lumped parameter model has been established in advance, and a preset proportion coefficient a is saved in the gasifier model. During the simulation of the gasifier model, the total feed 21 comprising coal, water, steam, oxygen, nitrogen, carbon dioxide, carbon monoxide, hydrogen, methane, etc., is input into the gasifier 20. Specifically, the gasifier 20 is divided into two virtual partitions, respectively the first virtual partition 22 (corresponding to the polygon ACDEFGB) and the second virtual partition 23 (the irregular shape of the gasifier 20 after the polygon ACDEFGB is removed). Among them, the first virtual partition 22 works at 1,400° C., and the second virtual partition 23 works at 1,600° C. Of the total feed, a % is input into the first virtual partition 22, and (100-a) % is input into the second virtual partition 23. In the gasifier model, the first virtual partition 22 and the second virtual partition 23 are simulated to perform gasification reactions independently. In addition, the gasifier model also determines: a virtual value of a gasifier parameter after mixing the first virtual partition 22 and the second virtual partition 23, and quenching and shifting 24 for a predetermined amount when gasification reactions reach equilibrium in the first virtual partition 22 and the second virtual partition 23.

In addition, the measured value of the gasifier parameter after inputting the same total feed into the real gasifier 20 and also quenching and shifting for the predetermined amount is determined (for example, retrieved from a historical database). Then, the value of the proportion coefficient a is adjusted based on the comparison result between the measured value and the virtual value of the gasifier parameter (wherein the parameters for the comparison are of the same type).

For example, when it is found that the measured value of the syngas temperature at the outlet is greater than the virtual value of the syngas temperature at the outlet, the proportion coefficient (i.e., (100-a) %) of the virtual partition corresponding to a high temperature (the second virtual partition 23) is increased or the proportion coefficient (a %) of the virtual partition corresponding to a low temperature (the first virtual partition 23) is decreased in the gasifier model, i.e., the proportion coefficient a is lowered.

For another example, when the measured value of the syngas composition at the outlet tends to be in a high temperature condition more than the virtual value of the syngas composition at the outlet, the proportion coefficient of the virtual partition corresponding to a high temperature (the second virtual partition 23) is increased or the proportion coefficient of the virtual partition corresponding to a low temperature (the first virtual partition 23) is decreased.

In some embodiments, virtually partitioning the gasifier by temperature includes: dividing the gasifier into a first virtual partition, a second virtual partition and a third virtual partition by temperature; wherein, inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of b %; in the second virtual partition, inputting feed split from the total feed at a proportion coefficient of (100-a-b) %; adjusting the proportional coefficients based on a comparison result between the measured value and the virtual value of the gasifier parameter comprises: modifying the values of a and b based on the comparison process between the measured value and the virtual value of the gasifier parameter.

Figure 3:
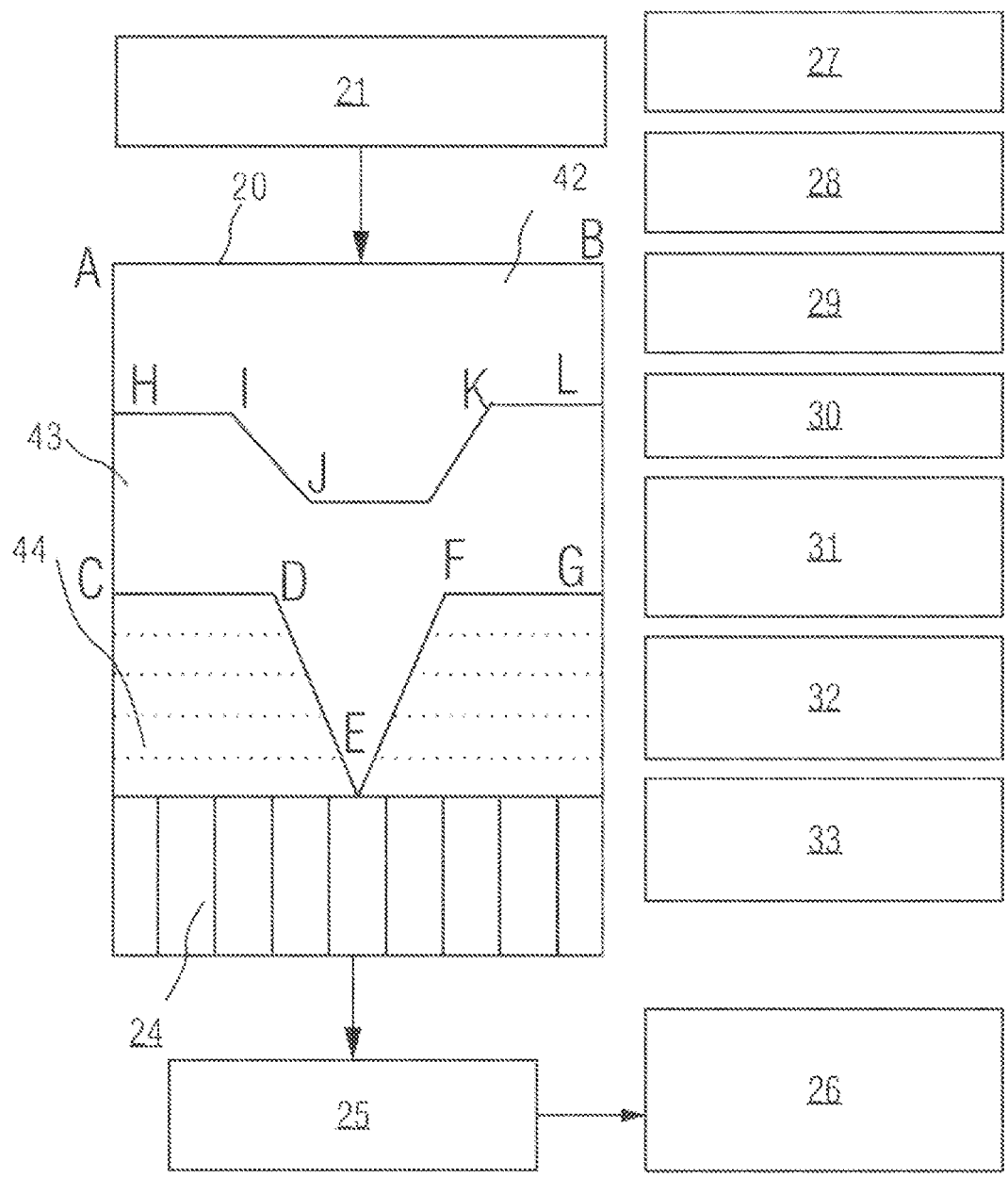
FIG. 3 is a flowchart of an example method for optimizing three virtual partitions incorporating teachings of the present disclosure.

FIG. 3 is a flowchart of an example method for optimizing three virtual partitions incorporating teachings of the present disclosure. A gasifier model in the form of a lumped parameter model has been established in advance, and preset proportion coefficients a and b are saved in the gasifier model. During the simulation of the gasifier model, the total feed 21 comprising coal, water, steam, oxygen, nitrogen, carbon dioxide, carbon monoxide, hydrogen, methane, etc., is input into the gasifier 20. Specifically, the gasifier 20 is divided into three virtual partitions, respectively the first virtual partition 42 (corresponding to the polygon AHIJKLB), the second virtual partition 43 (corresponding to the polygon HCDEFGLKJI), and the third virtual partition 44 (the irregular shape of the gasifier 20 after the polygon AHIJKLB and the polygon HCDEFGLKJI are removed). Among them, the first virtual partition 42 works at 800° C., the second virtual partition 43 works at 1,600° C., and the third virtual partition 44 works at 1,800° C. a % of the total feed is input into the first virtual partition 42, b % of the total feed is input into the second virtual partition 42, and (100-a-b) % of the total feed is input into the third virtual partition 44. In the gasifier model, the first virtual partition 42, the second virtual partition 43 and the third virtual partition 44 are simulated to perform gasification reactions independently. In addition, the gasifier model also determines: a virtual value of a gasifier parameter after mixing the first virtual partition 42, the second virtual partition 43 and the third virtual partition 44, and quenching and shifting 24 for a predetermined amount when gasification reactions reach equilibrium in the first virtual partition 42, the second virtual partition 43 and the third virtual partition 44.

In addition, the measured value of the gasifier parameter after inputting the same total feed into the real gasifier 20 and also quenching and shifting for the predetermined amount is determined (for example, retrieved from a historical database). Then, the value of the proportion coefficient a is adjusted based on the comparison result between the measured value and the virtual value of the gasifier parameter (wherein the parameters for the comparison are of the same type).

For example, when it is found that the measured value of the syngas temperature at the outlet is greater than the virtual value of the syngas temperature at the outlet, the proportion coefficient (i.e., (100-a-b) %) of the virtual partition corresponding to a high temperature (the third virtual partition 44) is increased, or the proportion coefficient (a %) of the virtual partition corresponding to a low temperature (the first virtual partition 43) is decreased in the gasifier model, thereby realizing fast adjustment. In the process, the proportion coefficient of the second virtual partition 44 between a high temperature and a low temperature may also be adjusted, for fine adjustment.

For another example, when the measured value of the syngas composition at the outlet tends to be in a high temperature condition more than the virtual value of the syngas composition at the outlet, the proportion coefficient of the virtual partition corresponding to a high temperature (the second virtual partition 43) is increased or the proportion coefficient of the virtual partition corresponding to a low temperature (the first virtual partition 43) is decreased. In the process, the proportion coefficient of the second virtual partition 44 between a high temperature and a low temperature may also be adjusted, for fine adjustment.

The implementation process is described above taking two or three virtual partitions as an example. Those skilled in the art may realize that more virtual partitions may be formed, which is not limited in the embodiments of the present disclosure. In consideration that the change in the composition at the outlet has relatively large inertial hysteresis and is an important reference parameter used by the operator, and that the cooling water temperature, the temperature difference in the burner cooling water and the temperature measurement of the thermocouple respond to the gasification condition relatively more timely, this needs to be reflected in the model. It can be assumed that the inertia $X=Ae^{(-kt)}$, and $\Delta X=Ae^{(-k\Delta t)}$ after discretization, wherein t is the time variable, k is the inertia time constant, X is the inertia before discretization, and $\Delta X$ is the inertia after discretization.

In the above processing, the gasifier model may have a plurality of differential equations expressing the dynamics for each virtual partition, and there are still mathematical descriptions of the mechanism in time steps after discretization, which is nonlinear. After verification with a large amount of historical measurement data and adjustment of some parameters, it is found that the nonlinearity is verified to be correct when the mathematical descriptions of the mechanism are consistent with the actual historical data. Then, the order is lowered and segmental linearization is performed, when a time constant may appear, making it especially suitable for the computation speed in real-time control and RTO.

In some embodiments, the method further comprises: enabling the gasifier model to determine a first time between the time of feed input to the time of outlet stabilization; measuring a second time between the time of feed input to the time of outlet stabilization; and adjusting the inertia time constant of the gasifier model based on the difference between the measured value and the virtual value of the gasifier parameter. Therefore, it is possible to identify the time constant through time-series training of dynamic working condition data. An example will be the first-order inertia time constant 26 of the syngas scrubbing and saturation process in FIG. 2 and FIG. 3.

With the above method, massive operating conditions are computed by use of historical data, and data calibration and model correction are performed, to group the data into stable operating condition data and dynamic data. For example, parameters such as the amounts of coal and syngas, etc., are corrected by the quality and energy balances with stable operating condition data. At the same time, various data of massive working conditions can be obtained, including: measured quantities, offline and online analysis quantities, for example, the oxygen volume, industrial and elemental analysis of the coal quality, slag and filter cake volumes, syngas composition, total amount, gasification pressure, temperature, temperature difference in burner cooling water, heat absorbed by each part of the water wall, data of the thermocouple on the wall, various calculated KPI data, temperature, substance distribution percentages, amount of quenching and shifting, etc. In addition, in the embodiments of the present invention, time and parameter variables can also be segmented and linearized together, to generate multidimensional data relationships for APC and RTO.

Figure 4:
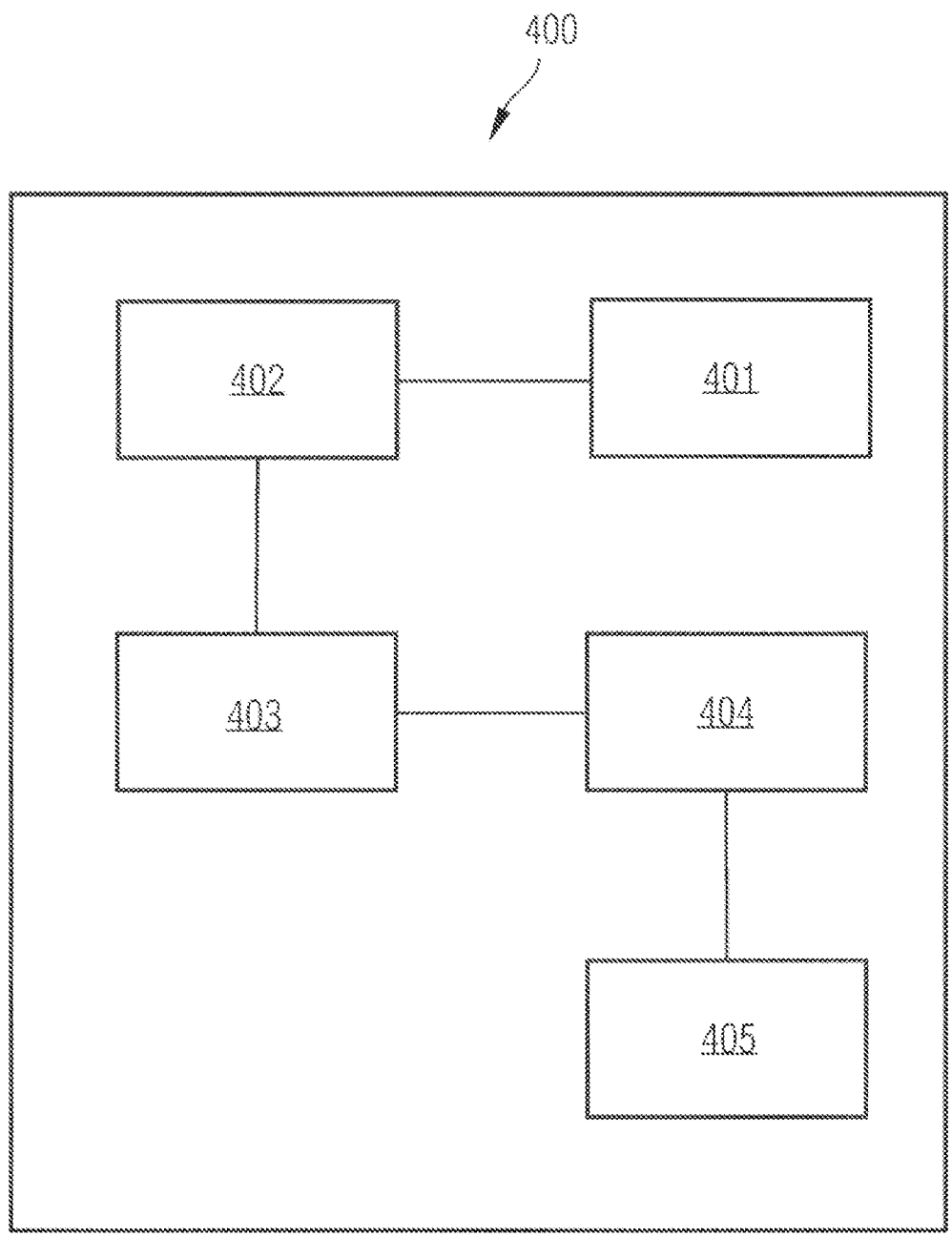
FIG. 4 is a structural diagram of an example apparatus for optimizing a gasifier model incorporating teachings of the present disclosure.

FIG. 4 is a structural diagram of an example apparatus for optimizing a gasifier model incorporating teachings of the present disclosure. As shown in FIG. 4, the apparatus 400 for optimizing a gasifier model comprises:

A partitioning module 401, used to virtually partition the gasifier by temperature;

An input module 402, used to enable the gasifier model to input feed split from total feed based on a respective proportion coefficient in each virtual partition, to perform gasification reactions independently by each virtual partition;

A virtual value determining module 403, used to enable the gasifier model to determine a virtual value of a gasifier parameter after mixing the virtual partitions, quenching and shifting when gasification reactions reach equilibrium in each virtual partition;

A measured value determining module 404, used to determine a measured value of the gasifier parameter when the total feed is input;

An adjusting module 405, used to adjust the proportion coefficients based on a comparison result between the measured value and the virtual value of the gasifier parameter.

In some embodiments, the partitioning module 401 is used to divide the gasifier into a first virtual partition and a second virtual partition; wherein, inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of (100-a) %; the adjusting module 405 is used to adjust the value of a based on a comparison result between the measured value and the virtual value of the gasifier parameter.

In some embodiments, the partitioning module 401 is used to divide the gasifier into a first virtual partition, a second virtual partition and a third virtual partition; inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of b %; in the second virtual partition, inputting feed split from the total feed at a proportion coefficient of (100-a-b) %; the adjusting module 405 is used to adjust the values of a and b based on a comparison result between the measured value and the virtual value of the gasifier parameter.

In some embodiments, the adjusting module 405 is used to perform at least one of the following: when the measured value of the syngas temperature at the outlet is greater than the virtual value of the syngas temperature at the outlet, increasing the proportion coefficient of the virtual partition corresponding to a high temperature or decreasing the proportion coefficient of the virtual partition corresponding to a low temperature; when the measured value of the syngas temperature at the outlet is smaller than the virtual value of the syngas temperature at the outlet, decreasing the proportion coefficient of the virtual partition corresponding to a high temperature or increasing the proportion coefficient of the virtual partition corresponding to a low temperature; when the measured value of the syngas composition at the outlet tends to be in a high temperature condition more than the virtual value of the syngas composition at the outlet, increasing the proportion coefficient of the virtual partition corresponding to a high temperature or decreasing the proportion coefficient of the virtual partition corresponding to a low temperature; when the measured value of the syngas composition at the outlet tends to be in a low temperature condition more than the virtual value of the syngas composition at the outlet, decreasing the proportion coefficient of the virtual partition corresponding to a high temperature or increasing the proportion coefficient of the virtual partition corresponding to a low temperature, etc.

In some embodiments, the adjusting module 405 is also used to enable the gasifier model to determine a first time between the time of total feed input to the time of outlet stabilization; measure a second time between the time of total feed input to the time of outlet stabilization; and adjust an inertia time constant of the gasifier model based on the difference between the first time and the second time.

Figure 5:
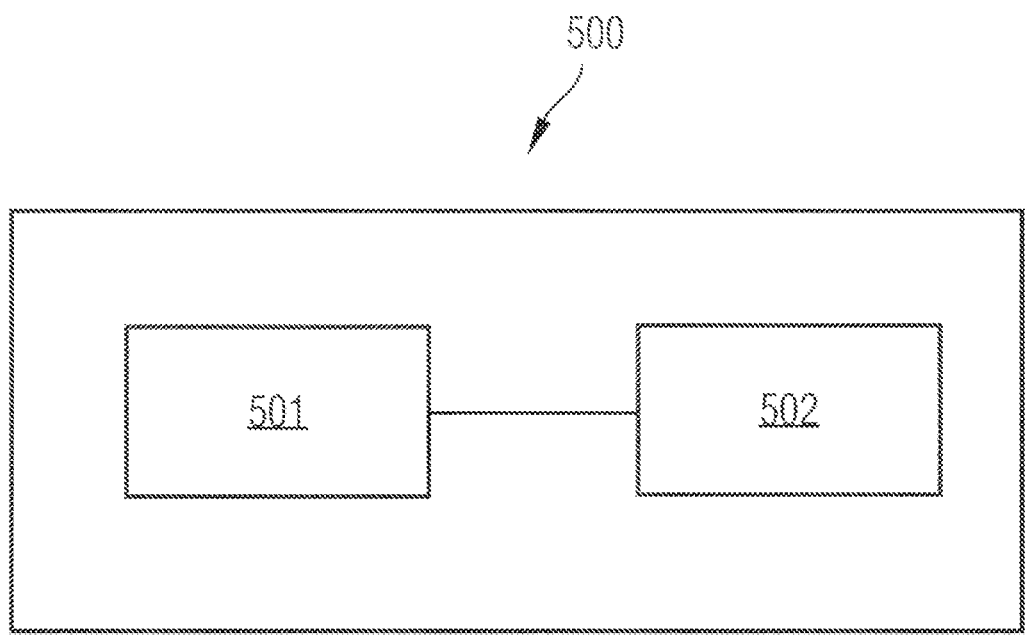
FIG. 5 is an exemplary structural diagram of an example apparatus for optimizing a gasifier model with the memory-processor architecture incorporating teachings of the present disclosure.

FIG. 5 is an exemplary structural diagram of an example apparatus for optimizing a gasifier model with the memory-processor architecture incorporating teachings of the present disclosure. As shown in FIG. 5, the optimizing apparatus 500 comprises a processor 501, a memory 502 and a computer program that is stored in the memory 502 and can be run on the processor 501, and the computer program, when executed by the processor 601, implements the optimizing method as described in any of the paragraphs above. Wherein, the memory 602 may be specifically implemented as a variety of storage media such as electrically erasable programmable read-only memory (EEPROM), flash memory, programmable read-only memory (PROM), etc. The processor 601 may be implemented to comprise one or more central processing units or one or more field-programmable gate arrays, wherein the field-programmable gate array integrates the cores of one or more central processing units. Specifically, the central processing unit or central processing unit core may be implemented as a CPU or MCU or DSP.

It should be noted that not all steps and modules in the above flowcharts and structural diagrams are necessary, and some steps or modules can be ignored based on actual needs. The sequence of execution of the steps is not fixed, and can be adjusted as needed. A functional division of the modules is used only to facilitate the description. In actual implementation, a module may be implemented by multiple modules, and the functions of multiple modules may be implemented by a single module. These modules may be located in a single device or in different devices. The hardware modules in each embodiment may be implemented mechanically or electronically. For example, a hardware module may comprise specially designed permanent circuits or logic devices (for example, dedicated processors, such as FPGA or ASIC) to complete specific operations. A hardware module may also comprise programmable logic devices or circuits temporarily configured by software (for example, general-purpose processors or other programmable processors) for performing specific operations. Whether to specifically use mechanical methods or dedicated permanent circuits or temporarily configured circuits (such as software configuration) to implement hardware modules may be determined according to cost and schedule considerations.

In some embodiments, a machine-readable storage medium stores an instruction used to cause a machine to execute one or more of the methods described herein. Specifically, a system or device equipped with a storage medium, with a software program code for implementing the functions of any of the above embodiments is stored on the storage medium, so that a computer (or CPU or MPU) of the system or device reads and executes the program code stored in the storage medium. In addition, the operating system operating on the computer may also be used to perform part or all of the actual operations through instructions based on the program code. It is also possible to write the program code read from the storage medium to the memory provided in an expansion board inserted into the computer or to the memory provided in an expansion unit connected to the computer, and then the program code-based instructions cause the CPU, etc., mounted on the expansion board or the expansion unit to perform part and all of the actual operations, so as to implement the functions of any of the above embodiments. Implementations of the storage media used to provide the program code include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROMs. Optionally, the program code may be downloaded from a server computer or a cloud via a communication network.

Here, "exemplary" means "serving as an example, instance or illustration", and any illustration or embodiment described as "exemplary" here may not be construed as a more preferred or advantageous technical solution. For simplification, the drawings only schematically show the parts, and do not represent the actual structure of a product. In addition, in order to make the drawings simple and easy to understand, only one of the parts of the same structure or function in some drawings is shown as an example, or only one of them is indicated. "One" herein does not mean limiting the number of relevant parts of the present invention to "only one", and "one" does not mean excluding the case that the number of relevant parts of the present invention is "more than one". The terms "upper", "lower", "front", "rear", "left", "right", "inner", "outer", etc., herein are only used to indicate the relative positional relationships between related parts, and do not limit the absolute positions of these related parts.

The above are only example embodiments of the present disclosure and do not limit the scope of the present disclosure. Any modification, equivalent replacement and improvement made without departing from the motivation and principle of the present disclosure shall be included in the scope thereof.

What is claimed is:

1. A method for optimizing a gasifier model, the method comprising:
   virtually partitioning the gasifier by temperature;
   enabling the gasifier model to input feed split from total feed based on a respective proportion coefficient in each virtual partition to perform gasification reactions independently by each virtual partition;
   enabling the gasifier model to determine a virtual value of a gasifier parameter after mixing the virtual partitions, quenching and shifting when gasification reactions reach an equilibrium in each virtual partition;
   determining a measured value of the gasifier parameter when the total feed is input; and
   adjusting the proportion coefficients based on a comparison result between the measured value and the virtual value of the gasifier parameter.

2. The method for optimizing a gasifier model as claimed in claim 1, wherein:
   virtually partitioning the gasifier by temperature includes dividing the gasifier into a first virtual partition and a second virtual partition by temperature;
   inputting feed split from total feed based on a respective proportion coefficient in each virtual partition comprises in the first virtual partition, inputting feed split from the total feed at a proportion coefficient of a %, and in the second virtual partition, inputting feed split from the total feed at a proportion coefficient of (100-a) %; and
   adjusting the proportion coefficients based on a comparison result between the measured value and the virtual value of the gasifier parameter comprises adjusting the value of said a based on a comparison result between the measured value and the virtual value of the gasifier parameter.

3. The method for optimizing a gasifier model as claimed in claim 1, wherein:
   virtually partitioning the gasifier by temperature includes dividing the gasifier into a first virtual partition, a second virtual partition, and a third virtual partition by temperature;
   inputting feed split from total feed based on a respective proportion coefficient in each virtual partition comprises: in the first virtual partition, inputting feed split from the total feed at a proportion coefficient of a %, in the second virtual partition, inputting feed split from the total feed at a proportion coefficient of b %, in the second virtual partition, inputting feed split from the total feed at a proportion coefficient of (100-a-b) %; and
   adjusting the proportion coefficients based on a comparison result between the measured value and the virtual value of the gasifier parameter comprises adjusting the values of said a and said b based on a comparison result between the measured value and the virtual value of the gasifier parameter.

4. The method for optimizing a gasifier model as claimed in claim 1, wherein
   adjusting the proportion coefficients based on a comparison result between the measured value and the virtual value of the gasifier parameter comprises at least one of the following:
   when the measured value of the syngas temperature at the outlet is greater than the virtual value of the syngas temperature at the outlet, increasing the proportion coefficient of the virtual partition corresponding to a high temperature or decreasing the proportion coefficient of the virtual partition corresponding to a low temperature;
   when the measured value of the syngas temperature at the outlet is smaller than the virtual value of the syngas temperature at the outlet, decreasing the proportion coefficient of the virtual partition corresponding to a high temperature or increasing the proportion coefficient of the virtual partition corresponding to a low temperature;
   when the measured value of the syngas composition at the outlet tends to be in a high temperature condition more than the virtual value of the syngas composition at the outlet, increasing the proportion coefficient of the virtual partition corresponding to a high temperature or decreasing the proportion coefficient of the virtual partition corresponding to a low temperature; and/or
   when the measured value of the syngas composition at the outlet tends to be in a low temperature condition more than the virtual value of the syngas composition at the outlet, decreasing the proportion coefficient of the virtual partition corresponding to high temperature or increasing the proportion coefficient of the virtual partition corresponding to low temperature.

5. The method for optimizing a gasifier model as claimed in claim 1, the method further comprising:
   enabling the gasifier model to determine a first time between the time of total feed input and the time of outlet stabilization;
   measuring a first time between the time of total feed input and the time of outlet stabilization; and
   adjusting an inertia time constant of the gasifier model based on the difference between the first time and the second time.

6. The method for optimizing a gasifier model as claimed in claim 1, wherein determining a measured value of the gasifier parameter when the total feed is input comprises: obtaining a current measured value of the gasifier parameter when the total feed is input, or querying a historical database to obtain a historical measured value of the gasifier parameter when the total feed is input.

7. The method for optimizing a gasifier model as claimed in claim 1, wherein
   the gasifier parameters include at least one parameter selected from the group consisting of: parameters at the outlet of the gasifier or at the periphery of the outlet; wherein the gasifier parameters include at least one of the following: a syngas temperature; a syngas composition; a temperature difference in burner cooling water; heat absorbed by burner support; heat absorbed by water wall; an oxygen/coal/steam ratio; heat absorbed by slag notch; particle size distribution of slag; a slag/filter cake ratio; thermocouple temperature distribution.

8. An apparatus for optimizing a gasifier model, the apparatus comprising:
   a partitioning module used to virtually partition the gasifier by temperature;
   an input module used to enable the gasifier model to input feed split from total feed based on a respective proportion coefficient in each virtual partition, to perform gasification reactions independently by each virtual partition;
   a virtual value determining module used to enable the gasifier model to determine a virtual value of a gasifier parameter after mixing the virtual partitions, quenching and shifting when gasification reactions reach equilibrium in each virtual partition;

a measured value determining module used to determine a measured value of the gasifier parameter when the total feed is input; and an adjusting module used to adjust the proportion coefficients based on a comparison result between the measured value and the virtual value of the gasifier parameter.

9. The apparatus for optimizing a gasifier model as claimed in claim 8, wherein:

the partitioning module is used to divide the gasifier into a first virtual partition and a second virtual partition by temperature;

inputting feed split from total feed based on a respective proportion coefficient in each virtual partition comprises: in the first virtual partition, inputting feed split from the total feed at a proportion coefficient of a %, in the second virtual partition, inputting feed split from the total feed at a proportion coefficient of (100-a) %; and the adjusting module is used to adjust the value of said a based on a comparison result between the measured value and the virtual value of the gasifier parameter.

10. The apparatus for optimizing a gasifier model as claimed in claim 8, wherein:

the partitioning module is used to divide the gasifier into a first virtual partition, a second virtual partition and a third virtual partition by temperature;

inputting feed split from total feed based on a respective proportion coefficient in each virtual partition comprises: in the first virtual partition, inputting feed split from the total feed at a proportion coefficient of a %; in the second virtual partition, inputting feed split from the total feed at a proportion coefficient of b %; in the second virtual partition, inputting feed split from the total feed at a proportion coefficient of (100-a-b) %;

the adjusting module adjusts the values of a and b based on a comparison result between the measured value and the virtual value of the gasifier parameter.

11. The apparatus for optimizing a gasifier model as claimed in claim 8, wherein the adjusting module performs at least one of the following:

when the measured value of the syngas temperature at the outlet is greater than the virtual value of the syngas temperature at the outlet, increasing the proportion coefficient of the virtual partition corresponding to a high temperature or decreasing the proportion coefficient of the virtual partition corresponding to a low temperature;

when the measured value of the syngas temperature at the outlet is smaller than the virtual value of the syngas temperature at the outlet, decreasing the proportion coefficient of the virtual partition corresponding to a high temperature or increasing the proportion coefficient of the virtual partition corresponding to a low temperature;

when the measured value of the syngas composition at the outlet tends to be in a high temperature condition more than the virtual value of the syngas composition at the outlet, increasing the proportion coefficient of the virtual partition corresponding to a high temperature or decreasing the proportion coefficient of the virtual partition corresponding to a low temperature; and/or when the measured value of the syngas composition at the outlet tends to be in a low temperature condition more than the virtual value of the syngas composition at the outlet, decreasing the proportion coefficient of the virtual partition corresponding to a high temperature or increasing the proportion coefficient of the virtual partition corresponding to a low temperature.

12. The apparatus for optimizing a gasifier model as claimed in claim 8, wherein the adjusting module enables the gasifier model to determine a first time between the time of total feed input to the time of outlet stabilization, to measure a second time between the time of total feed input to the time of outlet stabilization, and to adjust an inertia time constant of the gasifier model based on the difference between the first time and the second time.

13. An apparatus for optimizing a gasifier model, the apparatus comprising:

a processor;

a memory; and a computer program stored in the memory;

wherein the computer program, when executed by the processor, causes the processor to:

virtually partition the gasifier by temperature;

enable the gasifier model to input feed split from total feed based on a respective proportion coefficient in each virtual partition to perform gasification reactions independently by each virtual partition;

enable the gasifier model to determine a virtual value of a gasifier parameter after mixing the virtual partitions, quenching and shifting when gasification reactions reach an equilibrium in each virtual partition;

determine a measured value of the gasifier parameter when the total feed is input; and adjust the proportion coefficients based on a comparison result between the measured value and the virtual value of the gasifier parameter.

* * * * *